United States Patent [19]

Sahagian

[11] Patent Number: 4,930,558

[45] Date of Patent: Jun. 5, 1990

[54] INSERT FOR PNEUMATIC WHEEL

[76] Inventor: Edward H. Sahagian, 67 Chester St., Arlington, Mass. 02174

[21] Appl. No.: 320,563

[22] Filed: Mar. 8, 1989

[51] Int. Cl.$^5$ .............................................. B60C 5/22
[52] U.S. Cl. .................................. 152/339.1; 152/513; 152/400
[58] Field of Search ............... 152/381.4, 381.5, 381.6, 152/418, 521, 383, 379.3, 379.4, 379.5, 399, 400, 401, 30, 40, 47, 53, 56, 339.1, 342.1, 513; 301/95, 96, 97, 98

[56] References Cited

U.S. PATENT DOCUMENTS

| | | | |
|---|---|---|---|
| 2,798,525 | 7/1957 | Mantzel | 152/49 |
| 2,873,785 | 2/1959 | Howard | 301/97 X |
| 2,903,036 | 9/1959 | Wolfram | 152/49 |
| 2,921,811 | 1/1960 | Trevaskis | 295/12 |
| 3,060,990 | 10/1962 | Howard | 152/342.1 |
| 3,090,415 | 5/1963 | Sahagian | 152/41 |
| 3,145,754 | 8/1964 | Sarris | 152/342.1 |
| 3,288,193 | 11/1966 | Mantzel | 152/49 |
| 3,891,593 | 6/1959 | Deuring et al. | 152/49 |
| 3,935,892 | 2/1976 | Arimura et al. | 152/400 X |
| 4,108,232 | 8/1978 | Simpson | 152/513 |
| 4,401,144 | 8/1983 | Wilde | 152/379.5 X |
| 4,549,590 | 10/1985 | Sahagian | 152/41 |
| 4,765,382 | 8/1988 | Sahagian | 152/48 |

FOREIGN PATENT DOCUMENTS 1031662  6/1958  Fed. Rep. of Germany ... 152/339.1
846016   8/1960  United Kingdom ............... 152/513

Primary Examiner—Russell D. Stormer
Attorney, Agent, or Firm—Hamilton, Brook, Smith & Reynolds

[57] ABSTRACT

A resilient wheel has a rim (4) with an airtight annular channel (18) separated from the tire air space (19) by an annular elastomeric member (16). The sealed annular channel (18) is in pressure communication with the tire air space (19) and acts as a buffer absorbing abrupt transient pressure changes produced in the tire air chamber (19).

The elastomeric member (16) is seated in depressions (5) in the rim surface stabilizing the beads (6) of the tire mounted on the rim (4). Valve (30) in the rim (4) allows inflation of the annular air chamber (18), providing selective control for the resiliency of the wheel. Continuous radially extending portions (34) of the elastomeric member (16) serve to hold the tire beads (6) in place, the tire beads (6) residing between the extending portions (34) and radially extending portions of the rim structure.

9 Claims, 4 Drawing Sheets

INSERT FOR PNEUMATIC WHEEL

FIELD OF THE INVENTION

This invention relates to resilient wheels of the type in which an annular resilient shock absorbing element isolates the rim on which the tire is mounted from the central part or hub of the wheel which attaches to the brake drum. The shock absorbing element serves as an absorber of bumps and vibrations imparted to the tire and rim, as for example, from running over an obstacle or into a depression in a road surface.

BACKGROUND OF THE INVENTION

In spite of the enormous advance attained by the modern pneumatic tire in absorbing and suppressing road shocks, a very substantial amount of shock and vibration still is passed on by the tire to the standard metallic rim. The rim being fixed to or integral with the wheel and/or the metallic hub fixed therein, passes on shocks through the springs to the body. Lower tire pressures and softer springing have reduced the amount of shock and vibration thus transmitted, but these resorts bring other well known drawbacks in their turn, e.g., reduced handling precision.

An example of prior art resilient wheels includes U.S. Pat. No. 2,891,593 to Deuring et al. It disclosed a wheel having two rubber shock absorbing rings vulcanized to a divided rim, one ring to a supporting disc attached to the main wheel disc or hub, the other to an annular flange secured to the disc and diverging from the supporter ring. U.S. Pat. No. 2,903,036 to Walfram also discloses two rubber rings secured to annular rings bolted to bosses on the wheel hub and secured to the outer tire rim.

In both of these patents, the rubber shock absorbing rings are exposed directly to ambient air pressure on both their sides relying completely on their own resilience to absorb shocks.

In my prior U.S. Pat. No. 3,090,415, I disclosed a pneumatic tired vehicle wheel in which the rim was separated from the hub by a single band of rubber or other elastomeric material which isolated the hub from shock imparted to the tire or rim. In accordance with that invention, the rim is separated from all metallic contact with the wheel and/or hub of the vehicle by suspending the wheel within the rim in a continuous band of elastomeric material bonded to the rim along its lateral margins. The elastomeric material is also bonded to extensions or "spokes" on the wheel in alignment with apertures provided in the otherwise continuous felloe of the rim. The elastomeric material is subjected at such apertures to the air pressure within the tires, directly in the case of tubeless tires and through the intervening tube when such is used, so that the elastomeric material is stressed when the tire was inflated, imparting stability to the assembly.

To overcome this difficulty, I developed an improved resilient wheel forming the subject matter of U.S. Pat. No. 4,549,590, in which there is a central hub with a shock absorbing member between the rim and the central hub. It comprises an annular, pneumatically sealed, hollow, substantially toroidal member, at least a portion of which is flexible. Both the rim and the hub are attached to the toroidal member, one of which is attached to the flexible portion whereby shocks imparted to the rim are absorbed by the flexible portion and the air within the toroidal member.

Due to the possibility that the resilient wheel disclosed in my U.S. Pat. No. 4,549,590 might be susceptible to the shock absorbing member becoming disengaged from either the annular, substantially toroidal member surrounding the central hub or a cup like annular channel to which it is sealed, I developed a reinforced resilient wheel as disclosed in my U.S. Pat. No. 4,765,382. This wheel included a rim, a hub, and a shock absorbing air space formed between the channel and the elastomeric member. The wheel also included flange means clamping the elastomeric member to the rim, and reinforcing means for securing the elasomeric member to the rim, thus preventing disengagement of the shock absorbing member.

The evolution of the above-mentioned inventions led to the idea of a wheel with a cushioning effect derived from multiple air chambers within the wheel. The present invention is directed to a wheel having a continuous, impervious elastomeric member between the rim and the interior of the tire which creates two opposed air chambers acting in concert to absorb shock.

SUMMARY OF THE INVENTION

The invention resides in a resilient wheel having a circular hub, and an annular tire rim of substantially U-shaped cross section attached to the hub. A one-piece, annular, elastomeric member is secured to the exterior of the rim across the U-shaped annular channel creating a shock absorbing, sealed, air space defined by the inner surface of the elastomeric member and the inner surface of the U-shaped channel. With a tire mounted on the rim, a second sealed air space is defined by the outer surface of the elastomeric member and the inner surface of the tire. Thus, the two sealed air spaces are in pressure communication with each other through the elastomeric member.

In one embodiment of the invention, flanges are provided on the edges of the rim along which depressions are formed in the rim structure in a radially inward direction. The elastomeric member is seated in these depressions in the rim, and the beads of a tire mounted on the rim reside in the depressions in contact with the elastomeric member.

Another embodiment of the invention includes valve means for increasing or decreasing the pressure within the first sealed air space, allowing selective control of the resiliency of the wheel.

In still another embodiment of the present invention, the elastomeric member includes two continuous radially extending portions, both being an equal distance axially inward from one side of the rim. The distance from the extending portions to the sides of the rim is sized to allow the beads of a tire mounted on the rim to reside between one radially extending portion of the rim, and one of the extending portions of the elastomeric member.

The elastomeric member may be purposely made to extend in an axial direction beyond the outside edges of the rim. This gives some protection to the outside of the rim by having an elastomeric cushion between the edge of the rim and an object striking the rim. The extending elastomer also helps protect the wheel from corrosion.

With regard to structure, a particular embodiment of the present invention includes a circular hub with an annular tire rim of substantially U-shaped cross section secured to the exterior circumference of the hub. A cross section of the rim is symmetric about a hub diameter in the cross sectional plane. The rim, relative to the hub, has a first portion extending in both axial directions from the hub. To either side of the first portion, an attaching second portion extends in an axial and radial direction, each second portion attaching to a third portion. Each third portion extends in an axial direction and attaches to a fourth portion which extends radially. Each side terminates in a fifth portion attached to each fourth portion and extending in an axial direction.

A one-piece annular elastomeric member is bonded to both third, both fourth, and both fifth rim portions on the side of the rim away from the hub. The elastomeric member extends between the third rim portions such that a first sealed air space is defined by the inner surface of the elastomeric member and the surfaces of the first and both second rim portions on the side of the rim away from the hub. With a tire mounted on the rim, a second sealed air space is formed between the inner wall of the tire and the outer surface of the elastomeric member. The two air spaces are in pressure communication with one another through the elastomeric member.

The above and other features of the invention, including various novel details of construction and combinations of parts will now be more particularly described with reference to the accompanying drawings and pointed out in the claims. It will be understood that the particular resilient wheel embodying the invention is shown by way of illustration only and not as a limitation of the invention. The principles and features of this invention may be employed in varied and numerous embodiments without departing from the scope of the invention.

DETAILED DESCRIPTION OF THE INVENTION

Figure 1:
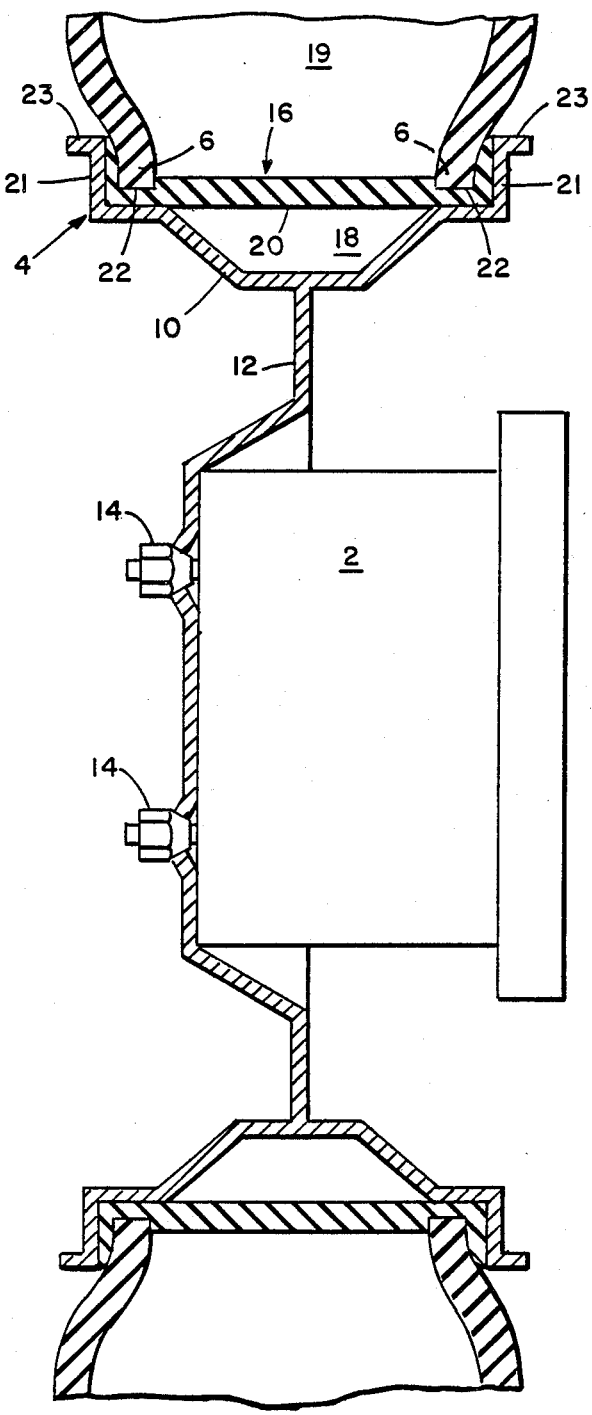
FIG. 1 is a sectional view of a portion of a wheel in which there is an annular, substantially U-shaped rim. The rim is attached to an annular, elastomeric member, the elastomeric member which separates the air space in the tire and the air space in the U-shaped portion of the rim.

Referring to FIG. 1, there is shown a cross section of a wheel having a brake drum 2, a tire rim generally indicated 4, and bead portions 6 of a tire mounted on the rim. A portion of the rim is in the form of an annular channel 10 which is generally U or V shaped in cross section. It is attached to a hub 12 which is secured by lug nuts 14 to the main wheel body including the brake drum 2.

A one-piece, annular, elastomeric member generally indicated 16 engages and is sealed to the rim 4 except along the portion forming annular channel 10. The elastomeric member 16 may be any appropriate elastomeric material such as rubber, butyl, or the like. An annular chamber 18 is thus created between the inner side of the annular channel 10 of the rim 4 and the inner side 20 of the elastomeric member 16 which faces the rim. With the tire beads 6 in place, the pressure applied by the tire beads 6 against the elastomeric member 16, forces the elastomeric member 16 against the tire rim 4 ensuring a tight seal between the tire beads 6, the elastomeric member 16, and the tire rim 4. When the tire is inflated, the elastomeric member 16 acts like a bladder providing pressure communication between annular chamber 18 and tire air chamber 19. When the air pressure chamber in 19 increases abruptly, due for example, to some unevenness to the road bed, the pressure increase in chamber 19 causes elastomeric member 16 to deflect, compressing annular chamber 18. Chamber 18 therefore acts as a buffer to chamber 19, absorbing the transient shock of abrupt pressure changes in the tire.

Using methods similar to those disclosed in my prior patents, elastomeric member 16 may be bonded to the rim 4 by appropriate bonding means such as vulcanizing. Elastomeric member 16 extends in an axial direction along rim 4, engaging tire beads 6. In this context, axial direction means in a direction which is parallel to the central axis or axis of rotation of the hub. The pressure of the tire beads 6 forms compressed channels 22 in the elastomeric member, further securing tire beads 6. Elastomeric member 16 continues along radial sections 21 of tire rim 4 against which the tire beads 6 are forced when the tire is pressurized. Tire rim 4 extends in an axial direction from radial sections 21 along sections 23.

Figure 2:
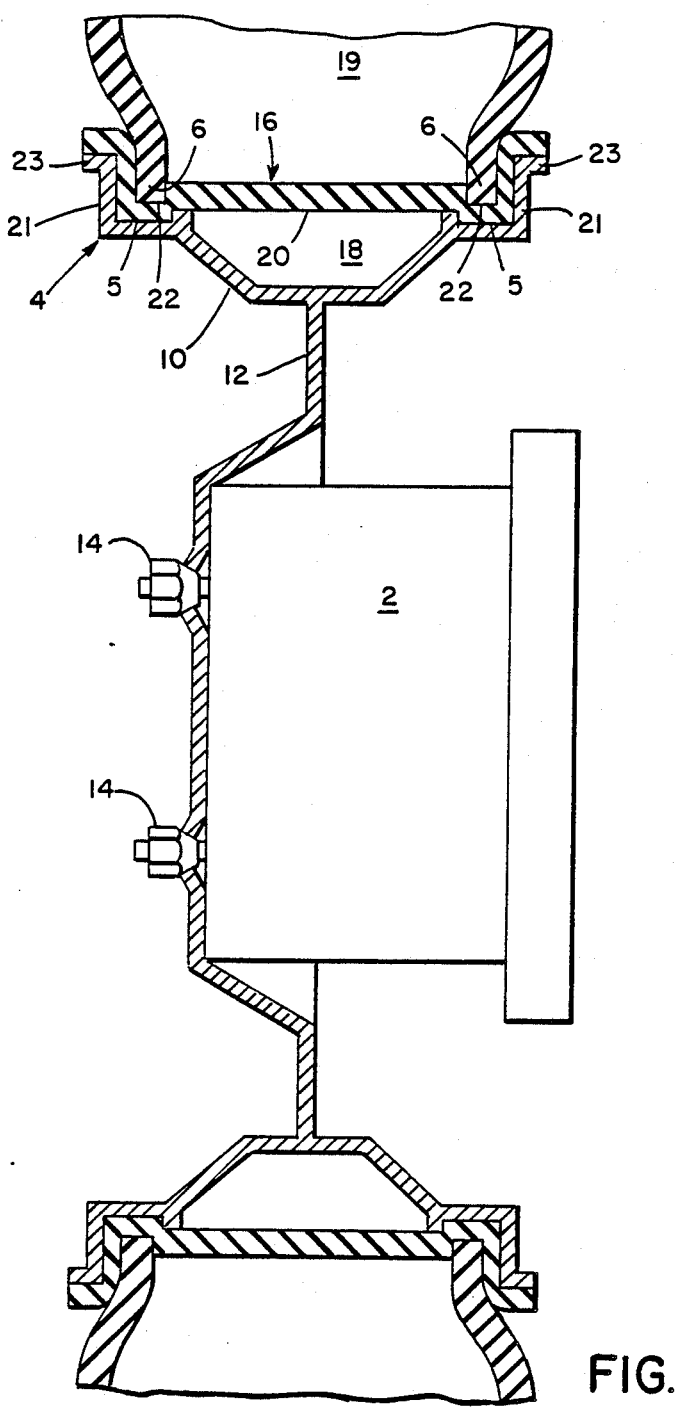
FIG. 2 is a view similar to FIG. 1 showing an embodiment of the rim having depressions in which the elastomeric member is seated, allowing the beads of the tire to be held firmly against that portion of the elastomeric member.

FIG. 2 shows another embodiment of the present invention. Tire rim 4 includes annular depressions 5 along the outer portion of the rim. The depressions 5 allow better control of the position of tire beads 6. When the tire is mounted on rim 4, the pressure of the tire beads against elastomeric member 16 forces the portion of the elastomeric member in contact with the tire beads into the annular grooves or depressions 5 in the rim 6. The pressure of the tire beads will still cause the natural compression of the elastomeric material as in the embodiment of FIG. 1, and the depressed rim channels 5 will allow the tire beads to reside in even deeper depressions relative to the remaining surface of the elastomeric member. This provides additional stability to secure the position of tire beads 6 within the rim 4.

Figure 3:
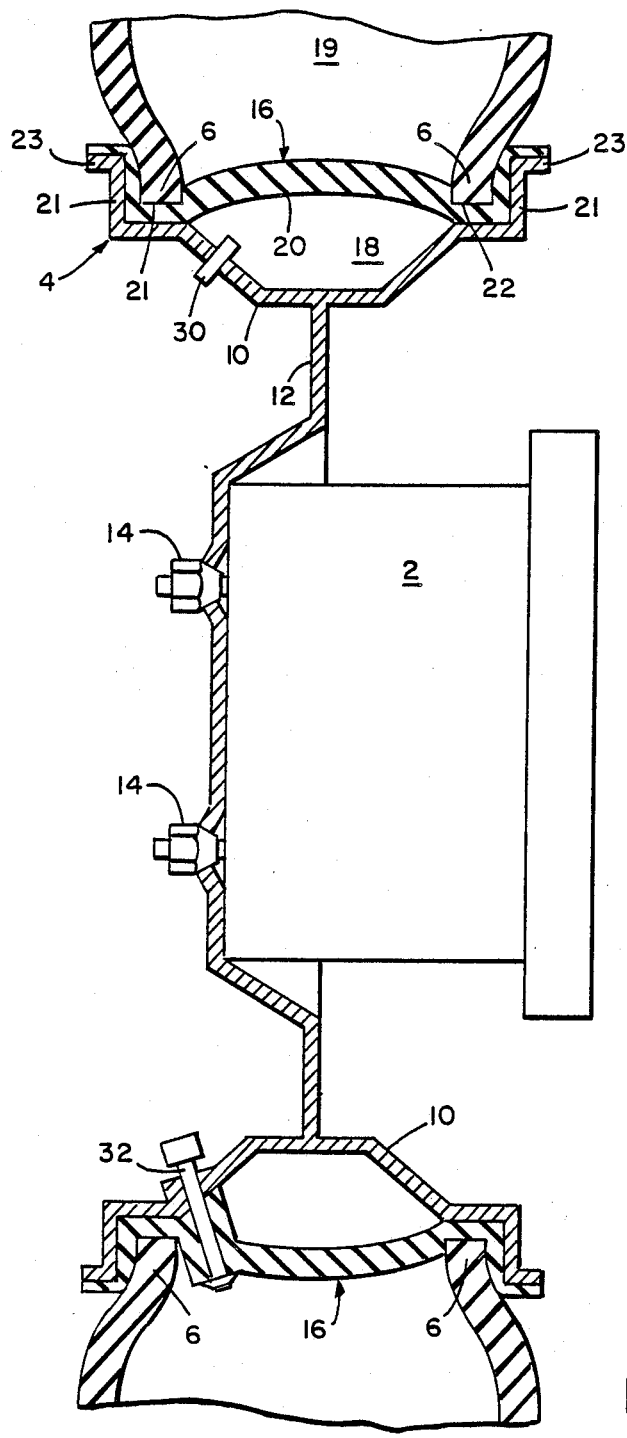
FIG. 3 is a variation of FIG. 1 including a valve means for inflating the air space within the U-shaped portion of the rim.

The embodiment of FIG. 3 is identical to that of FIG. 1, with the addition of a pressurizing stem valve 30 inserted and pneumatically sealed within portion 10 of tire rim 4. This valve 30 allows the annular chamber 18 to be selectively pressurized to adapt the shock absorbing properties of the wheel to a particular road surface. The valve 30 may enter the channel 10 directly, as seen in FIG. 3, or in any convenient manner depending on the particular configuration of the channel 10.

Increasing the pressure of chamber 18 makes the chamber less sensitive to transient pressure changes and reduces the volume of tire chamber 19, providing a firmer, more responsive ride. Decreasing the pressure of the chamber 18 allows the tire to absorb more of the shock from an uneven road, providing a smoother, more comfortable ride.

Tire pressurizing valve 32 is also shown in FIG. 3 to distinguish from channel pressurizing valve 30. Each of the previous embodiments also requires a similar tire pressurizing valve. In the present embodiment, the valve 32 passes through and is pneumatically sealed to tire rim portion 10 and elastomeric member 16. A relative pressure balance is formed between the annular channel 18 and the tire air chamber 19.

Figure 4:
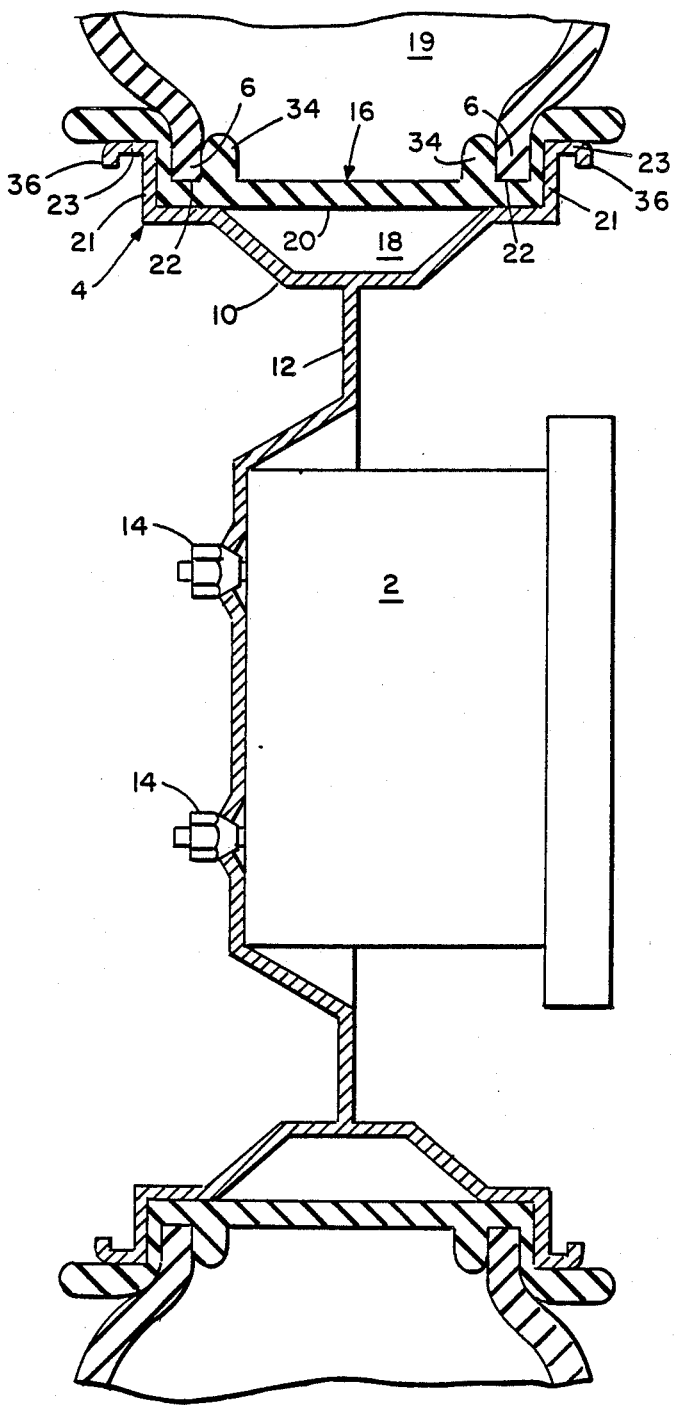
FIG. 4 is also a view similar to FIG. 1, the elastomeric member having radially extending portions which help hold the tire beads in place.

FIG. 4 shows still another embodiment of the present invention. Formed on elastomeric member 16 are continuous annular portions 34 extending radially outward from rim section 4 Radially extending portions 34 are positioned on elastomeric member 16 such that when the elastomeric member is sealed to the rim, the portions 34 are a distance from rim sections 21 in an axial direction which is slightly wider than the width of tire beads 6. Thus, when the tire is mounted, tire beads 6 reside in the gaps formed between portions 34 and the tire rim sections 21. The tire beads 6 are thereby held in place between the elastomer portions 34 and rim sections 21.

In addition to portions 34, the embodiment of FIG. 4 also differs from the embodiment of FIG. 1 in that rim portions 23 are bent over away from the tire forming extra rim portions 36. The elastomeric member is also made longer to extend over this portion of the rim. The extra rim portions 36 protect the tire from coming in contact with any sharp edges which may be exposed from rim portions 23. The extension of elastomeric member 16 serves to separate the tire and the rim portions 23, while also protecting the wheel from damage if the wheel sideswipes a curbstone or other protruding object. The elastomeric member also helps to protect the wheel from rust and corrosion.

I claim:
1. A resilient wheel having:
   a circular hub;
   an annular tire rim of substantially U-shaped cross section secured to the circumference of the hub and opening away from the hub;
   a one-piece, annular elastomeric member sealed against the outer portion of the rim on the side of the rim away from the hub forming a first sealed airtight space defined by the inner annular surface of the elastomeric member and the interior surface of the U-shaped portion of the rim;
   a tire mounted on the rim forming a second sealed airtight space defined by the outer annular surface of the elastomeric member and the inner surface of the tire;
   the elastomeric member having two continuous radially extending portions, each being located at an equal distance in an axial direction inwardly from one side of the rim, the distance being such that each bead of a tire mounted on the rim resides between a radial radially extending portion of one side of the rim and one of the extending portions of the elastomeric member and is subsequently held in place; and
   the elastomeric member being sufficiently resilient to allow transient pressure changes in the second sealed airtight space caused by external tire impact to be transmitted to and absorbed by the first sealed airtight space.

2. A resilient wheel according to claim 1 wherein the substantially U-shaped rim has flanges on the edges and depressions in the rim structure radially inward from the flanges, the elastomeric member being seated in these depressions, such that the beads of a tire mounted on the rim engage the elastomeric member creating depressions in the elastomeric member corresponding to the depressions in the rim, the depressions in the elastomeric member aiding in holding the tire beads in place.

3. A resilient wheel according to claim 1 further comprising valve means located in the annular tire rim for individually pressurizing the first sealed air space.

4. A resilient wheel according to claim 1 wherein the elastomeric member extends in an axial direction beyond the outside edge of the rim helping to protect the rim from damage.

5. A resilient wheel having:
   a circular hub;
   an annular tire rim of substantially U-shaped cross section secured to the exterior circumference of the hub, a cross section of the rim being symmetric about a hub diameter in the cross sectional plane;
   the rim, relative to the hub, having a first portion extending in both directions axially from the hub;
   to either side of the first portion a second portion extending in an axial and radial direction;
   a third portion extending from each second portion in an axial direction;
   a fourth portion extending radially from each third portion;
   a fifth portion extending from each fourth portion in an axial direction;
   a one-piece annular elastomeric member bonded against and conforming to the shape of both third, both fourth, and both fifth rim portions on the side of the rim away from the hub, and extending between the third portions such that a first sealed airtight space is defined by the inner surface of the elastomeric member and the surfaces of the first and both second rim portions on the side of the rim away from the hub; and
   a tire mounted on the rim forming a second sealed airtight space defined by the outer annular surface of the elastomeric member and tire , the elastomeric member being sufficiently resilient to allow transient pressure changes in the second sealed airtight space caused by external tire impact to be transmitted to and absorbed by the first sealed airtight space; and
   the elastomeric member having two continuous radially extending portions, each being located at an equal distance in an axial direction inwardly from one side of the rim, the distance being such that each bead of a tire mounted on the rim resides between a radially extending portion of one side of the rim and one of the extending portions of the elastomeric member, and is subsequently held in place.

6. A resilient wheel according to claim 5 wherein the third portions of the annular tire rim include depressions in a radially inward direction, the elastomeric member being seated in these depressions such that the beads of a tire mounted on the rim reside against the elastomeric member in the depressions and are subsequently held in place.

7. A resilient wheel according to claim 5 further comprising valve means located in the annular tire rim for individually pressurizing the first sealed air space.

8. A resilient wheel according to claim 5 further comprising sixth rim portions extending from the fifth rim portions in a substantially radially inward direction.

9. A resilient wheel according to claim 8 wherein the elastomeric member extends in an axial direction beyond the fifth rim portion.

* * * * *